US012604241B2

(12) United States Patent
Hong

(10) Patent No.: US 12,604,241 B2
(45) Date of Patent: Apr. 14, 2026

(54) CELL CAPABILITY INDICATION METHOD AND APPARATUS, CELL RESELECTION METHOD AND APPARATUS, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 329 days.

(21) Appl. No.: 18/286,217

(22) PCT Filed: Apr. 9, 2021

(86) PCT No.: PCT/CN2021/086116
§ 371 (c)(1),
(2) Date: Oct. 9, 2023

(87) PCT Pub. No.: WO2022/213351
PCT Pub. Date: Oct. 13, 2022

(65) Prior Publication Data
US 2024/0381192 A1 Nov. 14, 2024

(51) Int. Cl.
*H04W 36/00* (2009.01)
*H04W 36/08* (2009.01)

(52) U.S. Cl.
CPC ....... *H04W 36/0061* (2013.01); *H04W 36/08* (2013.01)

(58) Field of Classification Search
CPC .......................... H04W 36/0061; H04W 36/08
See application file for complete search history.

(56) References Cited

U.S. PATENT DOCUMENTS

| | | | |
|---|---|---|---|
| 9,967,000 B2 | 5/2018 | Chu | |
| 2015/0288207 A1 | 10/2015 | Walker, Jr. et al. | |
| 2015/0288423 A1 | 10/2015 | Chu | |
| 2018/0105053 A1* | 4/2018 | Ahmed | B60L 53/38 |
| 2020/0053602 A1* | 2/2020 | Kadiri | H04W 4/80 |
| 2022/0104094 A1* | 3/2022 | Lei | H04W 48/02 |

FOREIGN PATENT DOCUMENTS

| | | |
|---|---|---|
| CN | 104979864 A | 10/2015 |
| CN | 105493529 A | 4/2016 |
| CN | 106488407 A | 3/2017 |

(Continued)

OTHER PUBLICATIONS

International Search Report issued in Application No. PCT/CN2021/086116, dated Jan. 5, 2022, with English translation,(4p).

(Continued)

*Primary Examiner* — Justin Y Lee
(74) *Attorney, Agent, or Firm* — Arch & Lake LLP

(57) ABSTRACT

The present disclosure provides a cell capability indication method and apparatus, a cell reselection method and apparatus, and a storage medium. The cell capability indication method includes: sending target capability information of one or more neighboring cells, where the target capability information is for indicating wireless charging capabilities supported by the one or more neighboring cells.

18 Claims, 7 Drawing Sheets

Base Station | Terminal step 1301, broadcast a target system information block carrying target capability information of one or more neighboring cells through broadcast signaling, where the target capability information is for indicating wireless charging capabilities supported by the neighboring cells step 1302, in response to determining that a terminal is in an idle state, based on the received target capability information, determine a priority order of the neighboring cells for cell reselection step 1303, perform the cell reselection based on the priority order

(56) References Cited

FOREIGN PATENT DOCUMENTS

| | | | |
|---|---|---|---|
| CN | 107592645 | A | 1/2018 |
| CN | 108282810 | A | 7/2018 |
| CN | 110100476 | A | 8/2019 |
| CN | 110831100 | A | 2/2020 |
| CN | 106488407 | B | 4/2020 |
| CN | 110100476 | B | 5/2020 |
| CN | 111356191 | A | 6/2020 |
| CN | 111436088 | A | 7/2020 |
| EP | 2930817 | A2 | 10/2015 |
| IN | 202017035617 | A | 9/2020 |
| JP | 2013135497 | A | 7/2013 |
| WO | 2012160665 | A1 | 11/2012 |

OTHER PUBLICATIONS

European Patent Office, Extended European Search Report Issued in Application No. 21935580.7, Jan. 8, 2025, Germany, 11 pages.

State Intellectual Property Office of the People's Republic of China, Office Action and Search Report Issued in Application No. 2021800007672, Jan. 24, 2025, 20 pages. (Submitted with Machine Translation).

Oppo, "Discussion on NR System Information Design", 3GPP TSG-RAN2 Meeting #95, R2-164776, Goteborg, Sweden, Aug. 22-26, 2016, 4 pages.

The State of Intellectual Property Office of People's Republic of China, "First Office Action" issued in Application No. 202180000767.2 dated Jun. 18, 2024, with English Translation, (16p).

Written Opinion of the International Searching Authority of PCT Application No. PCT/CN2021/086116 dated Jan. 5, 2022, with English Translation, (7p).

* cited by examiner

Figures 1, 2, 3, 4, 5:
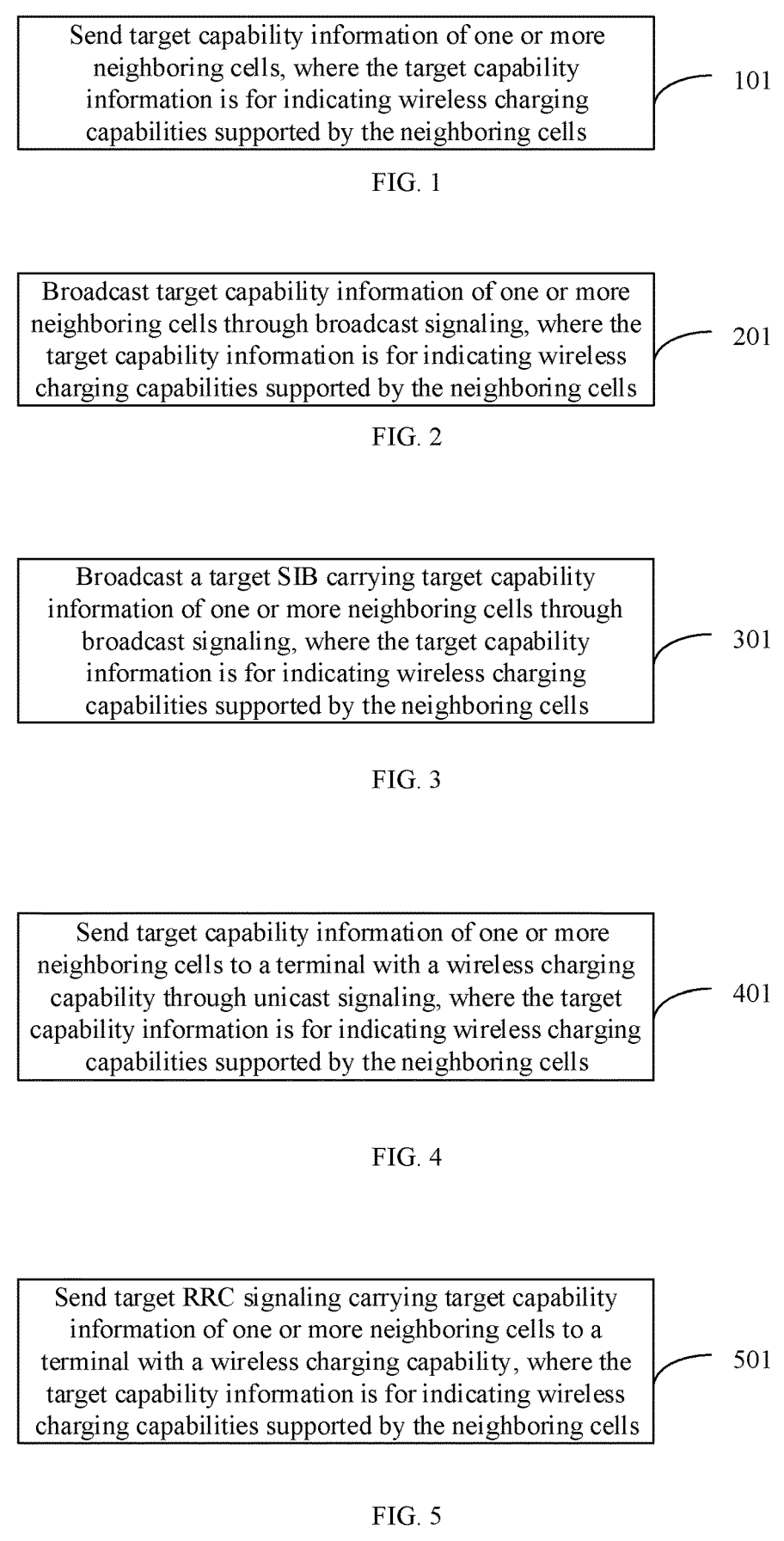

Send target capability information of one or more
neighboring cells, where the target capability
information is for indicating wireless charging
capabilities supported by the neighboring cells

Broadcast target capability information of one or more
neighboring cells through broadcast signaling, where the
target capability information is for indicating wireless
charging capabilities supported by the neighboring cells

Broadcast a target SIB carrying target capability
information of one or more neighboring cells through
broadcast signaling, where the target capability
information is for indicating wireless charging
capabilities supported by the neighboring cells

Send target capability information of one or more
neighboring cells to a terminal with a wireless charging
capability through unicast signaling, where the target
capability information is for indicating wireless charging
capabilities supported by the neighboring cells

Send target RRC signaling carrying target capability
information of one or more neighboring cells to a
terminal with a wireless charging capability, where the
target capability information is for indicating wireless
charging capabilities supported by the neighboring cells

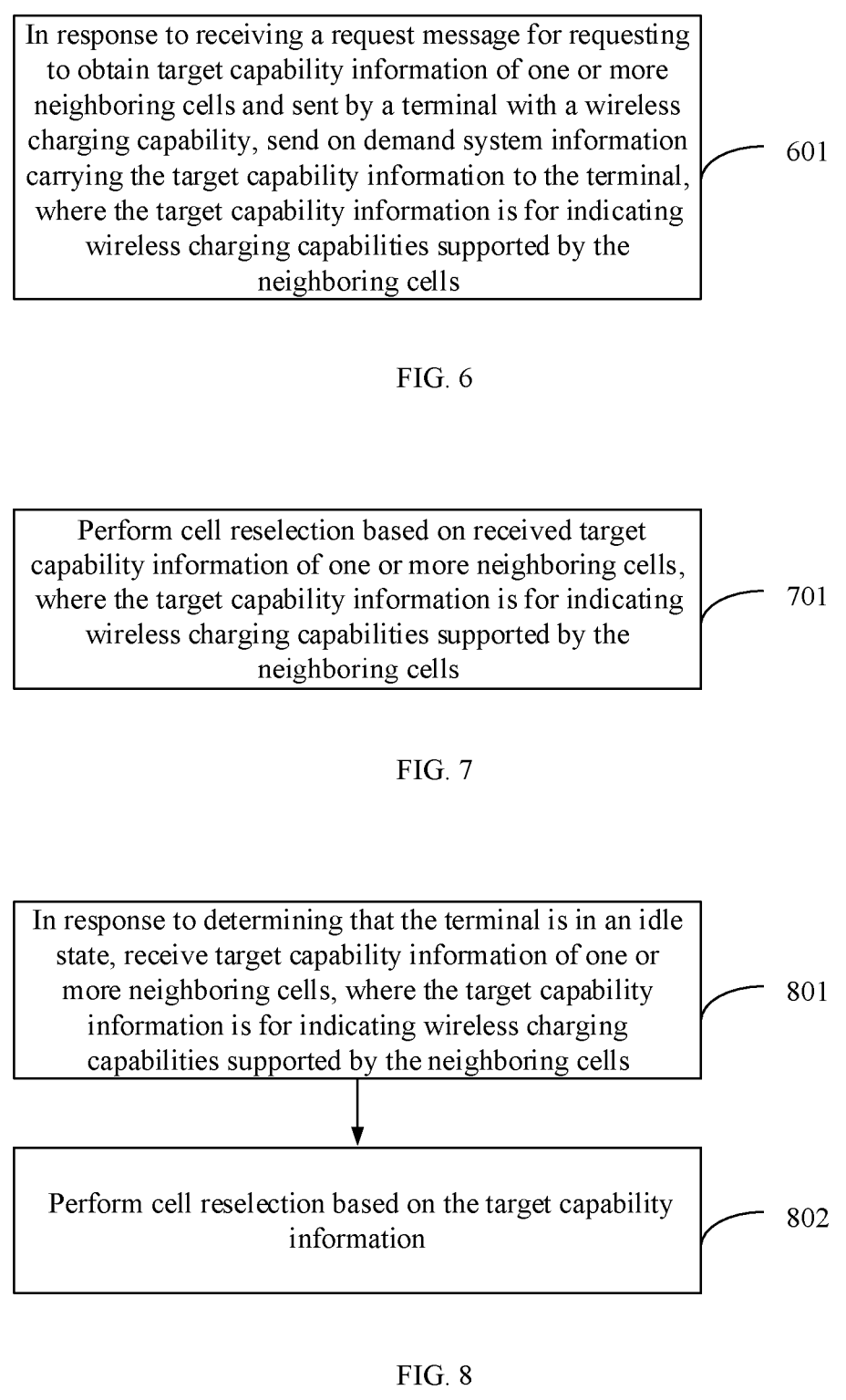

In response to receiving a request message for requesting to obtain target capability information of one or more neighboring cells and sent by a terminal with a wireless charging capability, send on demand system information carrying the target capability information to the terminal, where the target capability information is for indicating wireless charging capabilities supported by the neighboring cells — 601

FIG. 6

Perform cell reselection based on received target capability information of one or more neighboring cells, where the target capability information is for indicating wireless charging capabilities supported by the neighboring cells — 701

FIG. 7

In response to determining that the terminal is in an idle state, receive target capability information of one or more neighboring cells, where the target capability information is for indicating wireless charging capabilities supported by the neighboring cells — 801

Perform cell reselection based on the target capability information — 802

FIG. 8

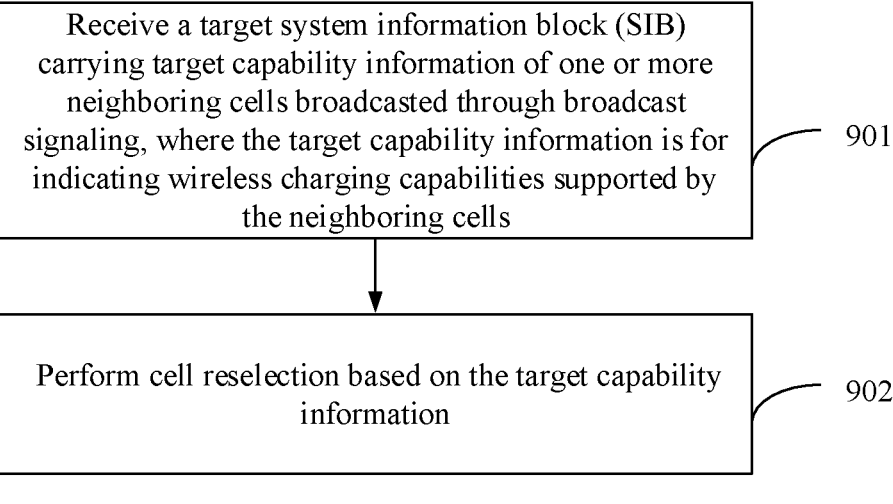

Receive a target system information block (SIB) carrying target capability information of one or more neighboring cells broadcasted through broadcast signaling, where the target capability information is for indicating wireless charging capabilities supported by the neighboring cells ⟍ 901

Perform cell reselection based on the target capability information ⟍ 902

FIG. 9

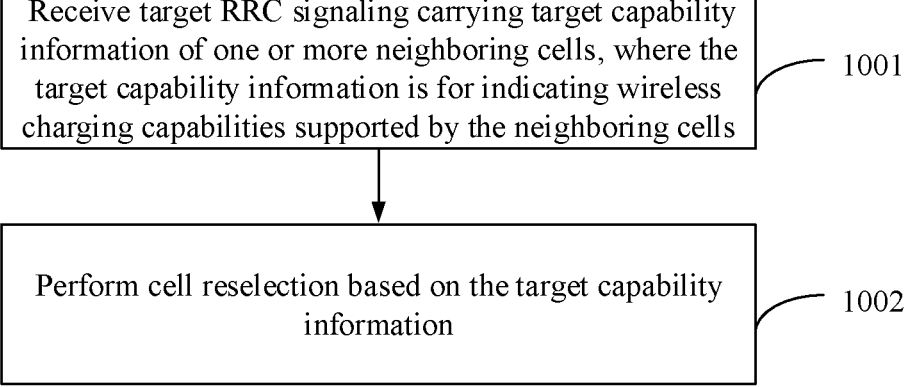

Receive target RRC signaling carrying target capability information of one or more neighboring cells, where the target capability information is for indicating wireless charging capabilities supported by the neighboring cells ⟍ 1001

Perform cell reselection based on the target capability information ⟍ 1002

FIG. 10

| Base Station | | Terminal |
|---|---|---| step 1501, in response to determining that a terminal is in an idle state, send a request message for requesting to obtain target capability information to a base station step 1502, based on the request message, send on demand system information carrying the target capability information to the terminal step 1503, based on the target capability information, determine a priority order of one or more neighboring cells for cell reselection step 1504, perform the cell reselection based on the priority order

FIG. 15

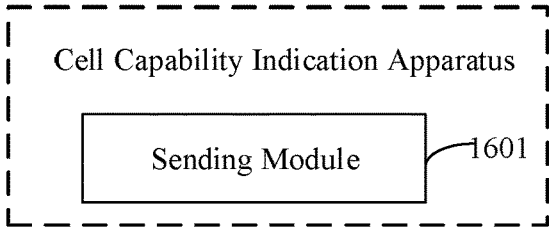

Cell Capability Indication Apparatus

Sending Module                    1601

FIG. 16

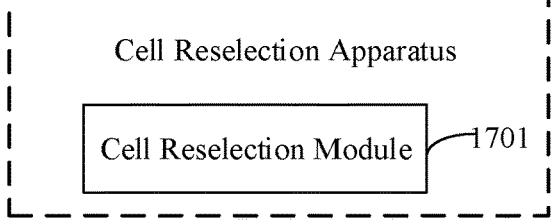

Cell Reselection Apparatus

Cell Reselection Module            1701

CELL CAPABILITY INDICATION METHOD AND APPARATUS, CELL RESELECTION METHOD AND APPARATUS, AND STORAGE MEDIUM

CROSS REFERENCE TO RELATED APPLICATIONS

This application is a U.S. national phase application of International Application No. PCT/CN2021/086116, filed on Apr. 9, 2021, the disclosure of which is incorporated herein by reference in its entirety for all purposes.

BACKGROUND

At present, wireless charging technology is mainly divided into three categories: electromagnetic induction technology, electromagnetic resonance technology, and wireless radio frequency technology.

Wireless radio frequency technology includes air-space charging technology, which can take space electric fields as a medium for energy transmission. For example, energy can be transmitted to a terminal through a large number of antennas in a form of extremely narrow beam, millimeter wave, and received by the terminal through one or more mini-beacon antennas, thus achieving long-distance wireless charging.

With the development of cellular mobile communication technology, especially millimeter wave communication technology, more and more antennas can be equipped on a base station. For example, massive multiple input multiple output (MIMO) is one of key technologies in the 5th generation mobile communication networks (5G).

SUMMARY

The present disclosure relates to the field of communication, and in particular to cell capability indication methods and apparatuses, cell reselection methods and apparatuses, and storage media.

According to a first aspect of the embodiments of the present disclosure, there is provided a cell capability indication method, performed by a base station, the method including:

sending target capability information of one or more neighboring cells, where the target capability information is for indicating wireless charging capabilities supported by the one or more neighboring cells.

According to a second aspect of the embodiments of the present disclosure, there is provided a cell reselection method, performed by a terminal, the method including:

performing cell reselection based on received target capability information of one or more neighboring cells, where the target capability information is for indicating wireless charging capabilities supported by the one or more neighboring cells.

According to a third aspect of the embodiments of the present disclosure, there is provided a non-transitory computer readable storage medium storing a computer program for implementing the cell capability indication method described in any embodiment of the first aspect.

According to a fourth aspect of the embodiments of the present disclosure, there is provided a non-transitory computer readable storage medium storing a computer program for implementing the cell reselection method described in any embodiment of the second aspect.

According to a fifth aspect of the embodiments of the present disclosure, there is provided a cell capability indication apparatus, including:

a processor; and a memory configured to store instructions executable by the processor;

where the processor is configured to perform the cell capability indication method described in any embodiment of the first aspect.

According to a sixth aspect of the embodiments of the present disclosure, there is provided a cell reselection apparatus, including:

a processor; and a memory configured to store instructions executable by the processor;

where the processor is configured to perform the cell reselection method described in any embodiment of the second aspect.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings herein, which are incorporated in and constitute a part of the specification, illustrate examples consistent with the present disclosure, and together with the specification, serve to explain the principles of the present disclosure.

FIG. 1 is a flowchart of a cell capability indication method according to one or more examples of the present disclosure.

FIG. 2 is a flowchart of another cell capability indication method according to one or more examples of the present disclosure.

FIG. 3 is a flowchart of another cell capability indication method according to one or more examples of the present disclosure.

FIG. 4 is a flowchart of another cell capability indication method according to one or more examples of the present disclosure.

FIG. 5 is a flowchart of another cell capability indication method according to one or more examples of the present disclosure.

FIG. 6 is a flowchart of another cell capability indication method according to one or more examples of the present disclosure.

FIG. 7 is a flowchart of a cell reselection method according to one or more examples of the present disclosure.

FIG. 8 is a flowchart of another cell reselection method according to one or more examples of the present disclosure.

FIG. 9 is a flowchart of another cell reselection method according to one or more examples of the present disclosure.

FIG. 10 is a flowchart of another cell reselection method according to one or more examples of the present disclosure.

FIG. 15 is a flowchart of another cell reselection method according to one or more examples of the present disclosure.

FIG. 16 is a block diagram of a cell capability indication apparatus according to one or more examples of the present disclosure.

FIG. 17 is a block diagram of a cell reselection apparatus according to one or more examples of the present disclosure.

DETAILED DESCRIPTION OF THE EMBODIMENTS

Figure 11:
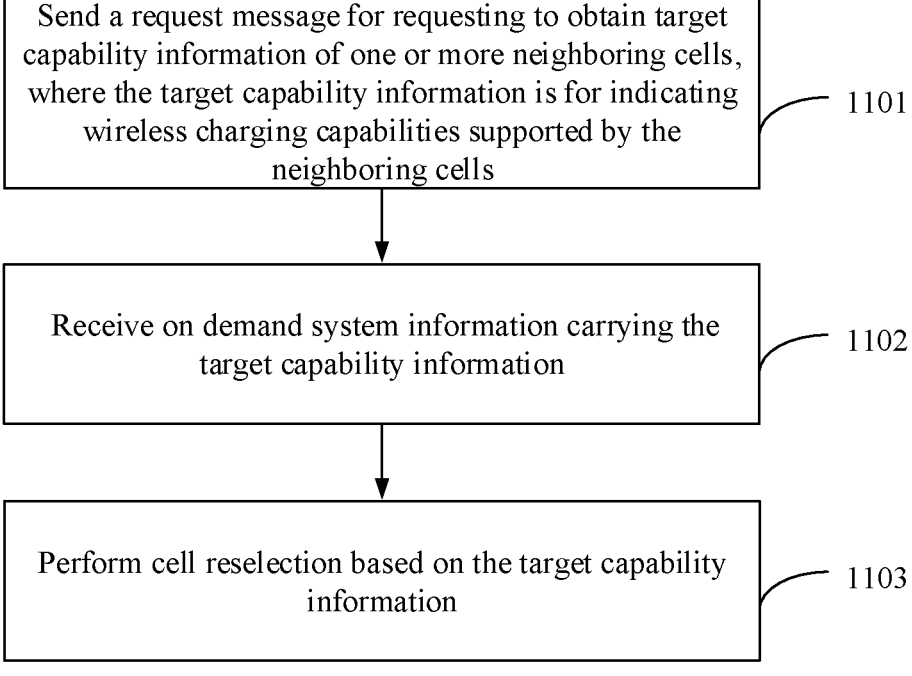
FIG. 11 is a flowchart of another cell reselection method according to one or more examples of the present disclosure.

Exemplary embodiments will be described in detail herein, examples of which are illustrated in the accompanying drawings. When the following descriptions involve the drawings, like numerals in different drawings refer to like or similar elements unless otherwise indicated. Implementations described in the following exemplary embodiments do not represent all implementations consistent with the present disclosure. Rather, they are merely examples of apparatuses and methods consistent with some aspects of the present disclosure as detailed in the appended claims.

Terms used in the embodiments of the present disclosure are for the purpose of describing specific embodiments only, and are not intended to limit the present disclosure. The singular forms "a" ("an"), "the" and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the present disclosure. Depending on the context, the word "if" as used herein can be interpreted as "at the time of", "when" or "in response to determining".

Next, cell capability indication methods provided by the present disclosure will be introduced.

One or more examples of the present disclosure provide a cell capability indication method, as shown in FIG. 1. FIG. 1 is a flowchart of the cell capability indication method according to the embodiment. The method can be applied to a base station, and include step 101.

In step 101, target capability information of one or more neighboring cells is sent, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

In the above embodiment, the base station can send the target capability information of the neighboring cells to one or more terminals, so that the terminals can perform cell reselection based on the wireless charging capabilities supported by the neighboring cells.

In the embodiment of the present disclosure, the base station can send the target capability information of the neighboring cells to one or more terminals, where the target capability information can be used to indicate the wireless charging capabilities supported by the neighboring cells. The terminal can perform cell reselection based on the target capability information. The present disclosure allows the terminals to more accurately perform cell reselection based on the wireless charging capabilities supported by the neighboring cells, with high availability.

In some embodiments, referring to FIG. 2, which is a flowchart of a cell capability indication method according to one or more examples of the present disclosure. The method can be applied to a base station, and include step 201.

In step 201, target capability information of one or more neighboring cells is broadcasted through broadcast signaling, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

In the above embodiment, the base station can broadcast the target capability information through broadcast signaling, which is easy to implement and high in availability.

In some embodiments, referring to FIG. 3, which is a flowchart of a cell capability indication method according to one or more examples of the present disclosure. The method can be applied to a base station, and include step 301.

In step 301, a target system information block (SIB) carrying target capability information of one or more neighboring cells is broadcasted through broadcast signaling, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

The target SIB can include an existing SIB or a newly added SIB. The existing SIB includes but is not limited to SIB3, SIB4, SIB5, SIB11, etc. The newly added SIB can be a new SIB agreed in a protocol for indicating the target capability information of the neighboring cells.

In a possible implementation, taking the target SIB being SIB4 as an example, the target capability information can be added to SIB4 in the following manner:

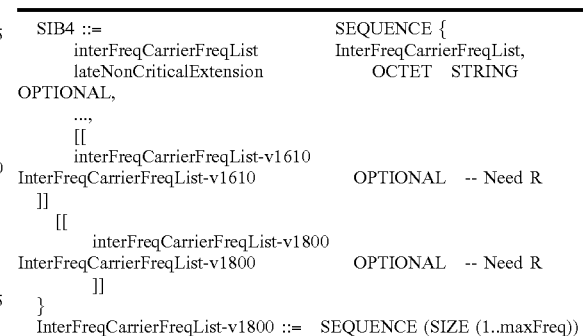

```
SIB4 ::=                              SEQUENCE {
    interFreqCarrierFreqList          InterFreqCarrierFreqList,
    lateNonCriticalExtension             OCTET   STRING
OPTIONAL,
    ...,
    [[
    interFreqCarrierFreqList-v1610
InterFreqCarrierFreqList-v1610           OPTIONAL   -- Need R
    ]]
    [[
        interFreqCarrierFreqList-v1800
InterFreqCarrierFreqList-v1800           OPTIONAL   -- Need R
        ]]
}
InterFreqCarrierFreqList-v1800 ::=   SEQUENCE (SIZE (1..maxFreq))
```

-continued

```
OF InterFreqCarrierFreqInfo-v1800
    InterFreqCarrierFreqInfo-v1800 ::=    SEQUENCE {
        interFreqNeighCellList-v1800
InterFreqNeighCellList-v1800
OPTIONAL,   -- Need R
    Wirelesscharging-r18              WirelessCharing-r18
    OPTIONAL,   -- Need R
    }
```

The above is only for illustrative explanation. The manner of adding the target capability information to other existing or newly added SIBs is similar to the above manner, and will not be repeated herein.

In the above embodiment, the base station can carry the target capability information in the target system information block and broadcast the target system information block through broadcast signaling, thereby informing terminals of the wireless charging capabilities supported by the neighboring cells, with high availability.

In some embodiments, referring to FIG. 4, which is a flowchart of a cell capability indication method according to one or more examples of the present disclosure. The method can be applied to a base station, and include step 401.

In step 401, target capability information of one or more neighboring cells is sent to a terminal with a wireless charging capability through unicast signaling, where the target capability information is for indicating wireless charging capabilities supported by the one or more neighboring cells.

In the above embodiment, the base station can pertinently send the target capability information of the neighboring cells to the terminal with the wireless charging capability through the unicast signaling, which saves broadcast signaling resources of the base station, especially system information block resources.

In some embodiments, referring to FIG. 5, which is a flowchart of a cell capability indication method according to one or more examples of the present disclosure. The method can be applied to a base station, and include step 501.

In step 501, target radio resource control (RRC) signaling carrying target capability information of one or more neighboring cells is sent to a terminal with a wireless charging capability, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells. The target RRC signaling includes but is not limited to RRC reconfiguration signaling or RRC connection reconfiguration signaling.

In the above embodiment, the base station can pertinently send the target capability information of the neighboring cells to the terminal with the wireless charging capability through the target RRC signaling, which saves broadcast signaling resources of the base station, especially system information block resources.

In some embodiments, referring to FIG. 6, which is a flowchart of a cell capability indication method according to one or more examples of the present disclosure. The method can be applied to a base station, and include step 601.

In step 601, in response to receiving a request message for requesting to obtain target capability information of one or more neighboring cells and sent by a terminal with a wireless charging capability, on demand system information carrying the target capability information is sent to the terminal, where the target capability information is for indicating wireless charging capabilities supported by the one or more neighboring cells.

In the embodiment of the present disclosure, the terminal can send the request message to the base station when needing to obtain the target capability information of the neighboring cells. Based on the request message, the base station sends the target capability information to the terminal through the on demand system information (on demand SI). The neighboring cells include but are not limited to at least one of intra-frequency neighboring cells, inter-frequency neighboring cells, or inter-radio access technology (inter-RAT) neighboring cells.

In the above embodiment, the base station can send the target capability information to the terminal requesting to obtain the target capability information of the neighboring cells through the on demand SI, which saves broadcast signaling resources of the base station, especially system information block resources.

In some embodiments, the target capability information of the neighboring cells includes but is not limited to at least one of: whether the neighboring cells support wireless charging, power information of wireless charging supported by the neighboring cells, efficiency information of wireless charging supported by the neighboring cells, cell configuration information of wireless charging supported by the neighboring cells, or maximum numbers of terminals in simultaneous wireless charging supported by the neighboring cells.

The efficiency information of wireless charging supported by the neighboring cells can be used to indicate a conversion rate of wireless charging performed by the neighboring cells. For example, if the efficiency information is 10%, it indicates that when a neighboring cell performs wireless charging, 10% of its own power can be converted into power for wireless charging of terminals.

The cell configuration information of wireless charging supported by the neighboring cells includes but is not limited to at least one of the following: time domain resource information, frequency domain resource information, or antenna number for wireless charging supported by the neighboring cells.

The above is only for illustrative explanation. Other cell capability information related to the wireless charging capabilities supported by the neighboring cells should fall within the protection scope of the present disclosure.

Next, cell reselection methods provided by the present disclosure will be introduced.

One or more examples of the present disclosure provide a cell reselection method, as shown in FIG. 7. FIG. 7 is a flowchart of the cell reselection method according to the embodiment. The method can be applied to a terminal, and include step 701.

In step 701, cell reselection is performed based on received target capability information of one or more neighboring cells, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

In the above embodiment, the terminal can accurately perform cell reselection based on the wireless charging capabilities supported by the neighboring cells, with high availability.

In some embodiments, referring to FIG. 8, which is a flowchart of a cell reselection method according to one or more examples of the present disclosure. The method can be applied to a terminal, and include steps 801 and 802.

In step 801, in response to determining that the terminal is in an idle state, target capability information of one or more neighboring cells is received, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

When in the idle state, that is, when there is no business to be processed, the terminal can receive the target capability information from the neighboring cells, for subsequent cell reselection based on the target capability information.

In step 802, cell reselection is performed based on the target capability information. In the above embodiment, the terminal can receive the target capability information from the neighboring cells when in the idle state, so as to perform the cell reselection based on the target capability information, improving the accuracy of the cell reselection.

In some embodiments, referring to FIG. 9, which is a flowchart of a cell reselection method according to one or more examples of the present disclosure. The method can be applied to a terminal, and include steps 901 and 902.

In step 901, a target system information block (SIB) carrying target capability information of one or more neighboring cells broadcasted through broadcast signaling is received, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells. The terminal can receive the target SIB sent by a base station through the broadcast signaling, thereby obtaining the target capability information therein. The target SIB can include an existing SIB or a newly added SIB, which is not limited in the present disclosure.

In step 902, cell reselection is performed based on the target capability information.

In the above embodiment, the terminal can receive the target system information block carrying the target capability information broadcasted through the broadcast signaling, so that the cell reselection can be performed more accurately according to the wireless charging capability supported by the neighboring cells, with high availability.

In some embodiments, referring to FIG. 10, FIG. 10 is a flowchart of a cell reselection method according to one or more examples of the present disclosure. The method can be applied to a terminal, and include steps 1001 and 1002.

In step 1001, target radio resource control (RRC) signaling carrying target capability information of one or more neighboring cells is received, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells. The target RRC signaling includes RRC reconfiguration signaling or RRC connection reconfiguration signaling.

In step 1002, cell reselection is performed based on the target capability information.

In the above embodiment, the terminal can receive unicast signaling sent by a base station, which can be the target RRC signaling. The terminal can perform the cell reselection more accurately based on the target capability information added to the target RRC signaling.

In some embodiments, referring to FIG. 11, which is a flowchart of a cell reselection method according to one or more examples of the present disclosure. The method can be applied to a terminal, and include steps 1101 to 1103.

In step 1101, a request message for requesting to obtain target capability information of one or more neighboring cells is sent, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells. When in an idle state, the terminal can switch to a connected state and send the obtaining request to a base station.

In step 1102, on demand system information carrying the target capability information is received.

In step 1103, cell reselection is performed based on the target capability information.

In the above embodiment, the terminal can send the obtaining request to the base station, so as to obtain the on demand system information carrying the target capability information of the neighboring cells returned by the base station based on the obtaining request. The terminal can more accurately perform the cell reselection based on the target capability information.

Figure 12:
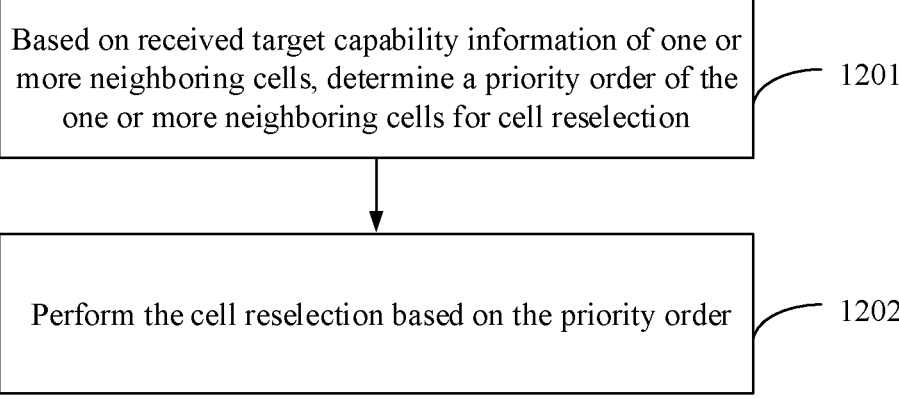
FIG. 12 is a flowchart of another cell reselection method according to one or more examples of the present disclosure.

In some embodiments, referring to FIG. 12, which is a flowchart of a cell reselection method according to one or more examples of the present disclosure. The method can be applied to a terminal, and include steps 1201 and 1202.

In step 1201, based on received target capability information of one or more neighboring cells, a priority order of the one or more neighboring cells for cell reselection is determined.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

In a possible implementation, when the terminal prioritizes the neighboring cells, the priority of neighboring cells that support wireless charging can be increased. That is, the priority of a first neighboring cell that supports wireless charging can be higher than the priority of a second neighboring cell that does not support wireless charging.

In another possible implementation, when the terminal prioritizes the neighboring cells, for neighboring cells that support wireless charging, the priority of neighboring cells with strong wireless charging capabilities can be increased. That is, in the case where a wireless charging capability supported by a third neighboring cell is higher than that supported by a fourth neighboring cell, the priority of the third neighboring cell can be higher than the priority of the fourth neighboring cell.

In step 1202, the cell reselection is performed based on the priority order.

In a possible implementation, the terminal can, according to the priority order of the neighboring cells from high to low, match wireless charging capabilities supported by the neighboring cells with the wireless charging capability supported by the terminal itself, and determine a neighboring cell with a highest matching degree between the wireless charging capability supported by the neighboring cell and the wireless charging capability supported by the terminal and a highest priority order as a target neighboring cell for the cell reselection.

In another possible implementation, when performing the cell reselection, in addition to the priority order and the matching degree of wireless charging capabilities, the terminal can refer to cell signal qualities of the neighboring cells. A neighboring cell with a highest matching degree between the wireless charging capability supported by the neighboring cell and the wireless charging capability supported by the terminal, a best cell signal quality, and a highest priority order can be determined as a target neighboring cell for the cell reselection.

In the above embodiment, the terminal can more accurately perform the cell reselection based on the wireless charging capabilities supported by the neighboring cells, with high availability.

In some embodiments, the target capability information includes at least one of: whether the neighboring cells support wireless charging, power information of wireless charging supported by the neighboring cells, efficiency information of wireless charging supported by the neighboring cells, cell configuration information of wireless charging supported by the neighboring cells, or maximum numbers of terminals in simultaneous wireless charging supported by the neighboring cells.

Figure 13:
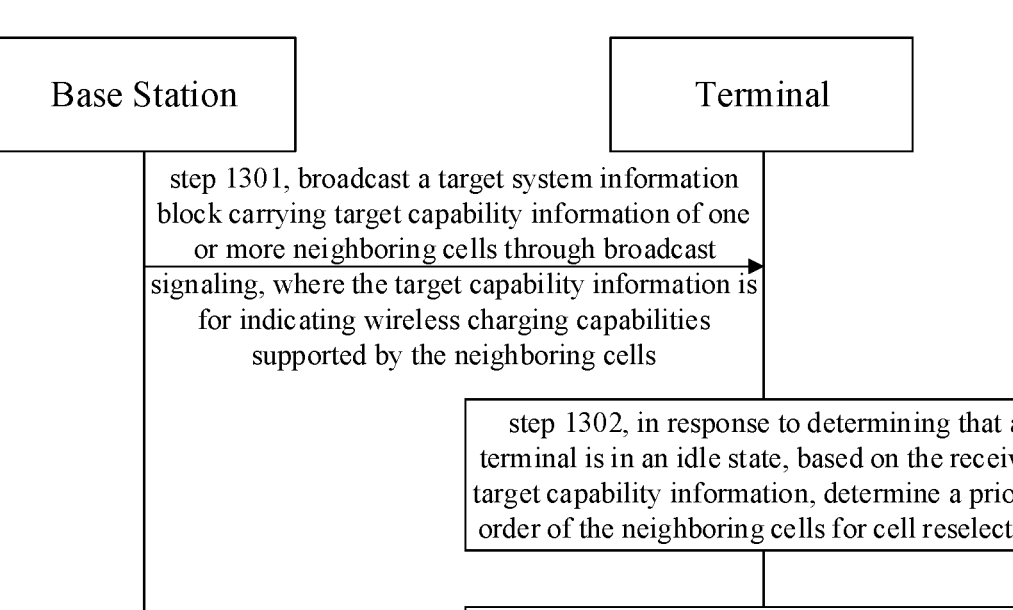
FIG. 13 is a flowchart of another cell reselection method according to one or more examples of the present disclosure.

In some embodiments, referring to FIG. 13, which is a flowchart of a cell reselection method according to one or more examples of the present disclosure. The method may include steps 1301 to 1303.

In step 1301, a base station broadcasts a target system information block carrying target capability information of one or more neighboring cells through broadcast signaling, where the target capability information is for indicating wireless charging capabilities supported by the one or more neighboring cells.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells.

In step 1302, in response to determining that a terminal is in an idle state, the terminal determines, based on the received target capability information, a priority order of the neighboring cells for cell reselection.

In step 1303, the terminal performs the cell reselection based on the priority order.

In the above embodiment, the base station can broadcast the target capability information through the broadcast signaling. When in the idle state, the terminal performs the cell reselection based on the received target capability information, improving the accuracy of the cell reselection.

Figure 14:
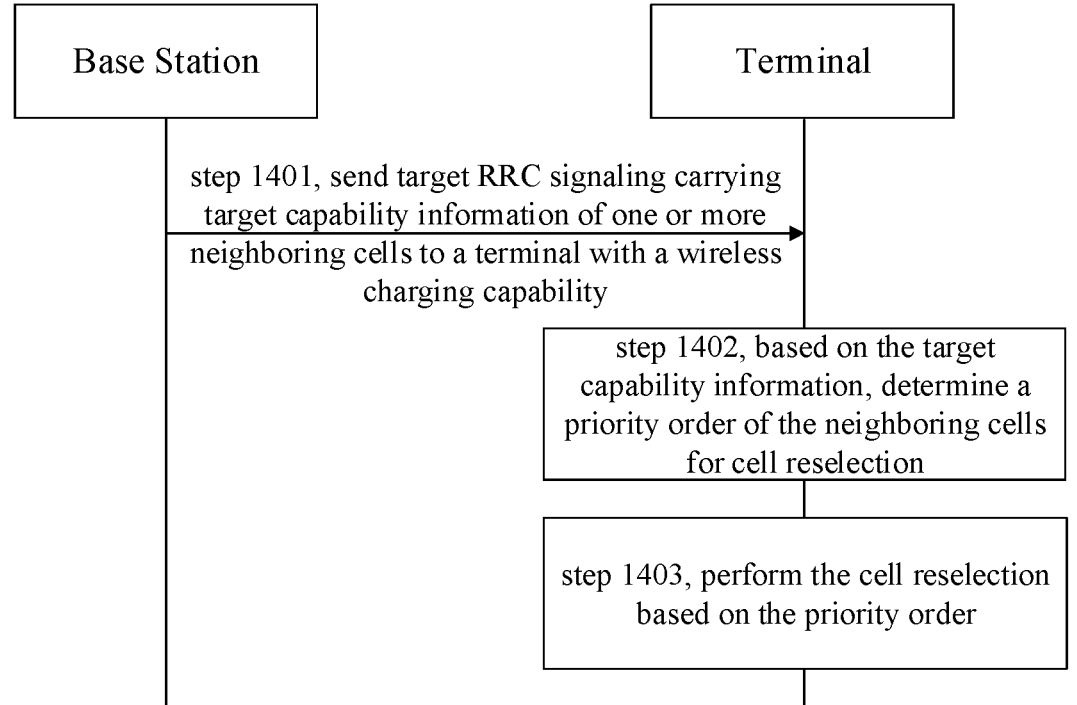
FIG. 14 is a flowchart of another cell reselection method according to one or more examples of the present disclosure.

In some embodiments, referring to FIG. 14, FIG. 14 is a flowchart of a cell reselection method according to one or more examples of the present disclosure. The method may include steps 1401 to 1403.

In step 1401, a base station sends target radio resource control (RRC) signaling carrying target capability information of one or more neighboring cells to a terminal with a wireless charging capability.

In the embodiment of the present disclosure, the one or more neighboring cells include but are not limited to at least one of: one or more intra-frequency neighboring cells, one or more inter-frequency neighboring cells, or one or more inter-radio access technology (inter-RAT) neighboring cells. The target RRC signaling includes RRC reconfiguration signaling or RRC connection reconfiguration signaling.

In step 1402, the terminal determines, based on the target capability information, a priority order of the neighboring cells for cell reselection.

In step 1403, the terminal performs the cell reselection based on the priority order.

In the above embodiment, the base station can inform the terminal of the target capability information through unicast signaling which can be the target RRC signaling. The terminal performs the cell reselection based on the received target capability information, improving the accuracy of the cell reselection while saving system information block resources. In some embodiments, referring to FIG. 15, which is a flowchart of a cell reselection method according to one or more examples of the present disclosure. The method may include steps 1501 to 1504.

In step 1501, in response to determining that a terminal is in an idle state, the terminal sends a request message for requesting to obtain target capability information to a base station.

In step 1502, the base station sends, based on the request message, on demand system information carrying the target capability information to the terminal.

In step 1503, the terminal determines, based on the target capability information, a priority order of one or more neighboring cells for cell reselection.

In step 1504, the terminal performs the cell reselection based on the priority order.

In the above embodiment, the terminal can send the request message to the base station when in the idle state. Based on the request message, the base station informs the terminal of the target capability information of the neighboring cells, so that the terminal can perform the cell reselection based on the received target capability information. This improves the accuracy of the cell reselection while saving system information block resources.

Corresponding to the aforementioned embodiments of application function implementation methods, the present disclosure also provides embodiments of application function implementation apparatuses.

Referring to FIG. 16, which is a block diagram of a cell capability indication apparatus according to one or more examples of the present disclosure. The apparatus is applied to a base station and includes:

a sending module 1601, configured to send target capability information of one or more neighboring cells, where the target capability information is for indicating wireless charging capabilities supported by the one or more neighboring cells.

Referring to FIG. 17, which is a block diagram of a cell reselection apparatus according to one or more examples of the present disclosure. The apparatus is applied to a terminal and includes:

a cell reselection module 1701, configured to perform cell reselection based on received target capability information of one or more neighboring cells, where the target capability information is for indicating wireless charging capabilities supported by the one or more neighboring cells.

Since apparatus embodiments basically correspond to method embodiments, the description of method embodiments can be made reference for relevant information. The apparatus embodiments described above are only schematic, where the above units described as separate components may or may not be physically separated, and the components displayed as units may or may not be physical units, that is, they can be located in one place or distributed to multiple network units. Some or all of the modules can be selected according to actual needs to achieve the purpose of the solution in the present disclosure. Ordinary technical personnel in the art can understand and implement without creative labor.

Correspondingly, the present disclosure also provides a non-transitory computer readable storage medium storing a computer program for implementing any one of the above cell capability indication methods.

Correspondingly, the present disclosure also provides a non-transitory computer readable storage medium storing a computer program for implementing any one of the above cell reselection methods.

Correspondingly, the present disclosure also provides a cell capability indication apparatus, including:

a processor; and a memory configured to store instructions executable by the processor;

where the processor is configured to perform any one of the above cell capability indication methods.

Figure 18:
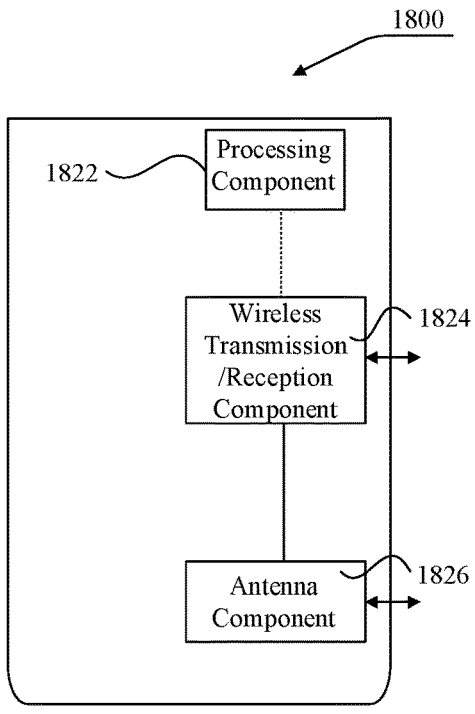
FIG. 18 is a schematic structural diagram of a cell capability indication apparatus according to one or more examples of the present disclosure.

As shown in FIG. 18, FIG. 18 is a schematic structural diagram of a cell capability indication apparatus 1800 according to one or more examples of the present disclosure. The apparatus 1800 can be provided as a base station. Referring to FIG. 18, the apparatus 1800 includes a processing component 1822, a wireless transmission/reception component 1824, an antenna component 1826, and a signal processing portion unique to a wireless interface. The processing component 1822 may further include one or more processors.

One of the processors in the processing component 1822 can be configured to perform any of the aforementioned cell capability indication methods.

Correspondingly, the present disclosure also provides a cell reselection apparatus, including:

a processor; and a memory configured to store instructions executable by the processor;

where the processor is configured to perform any one of the above cell reselection methods.

Figure 19:
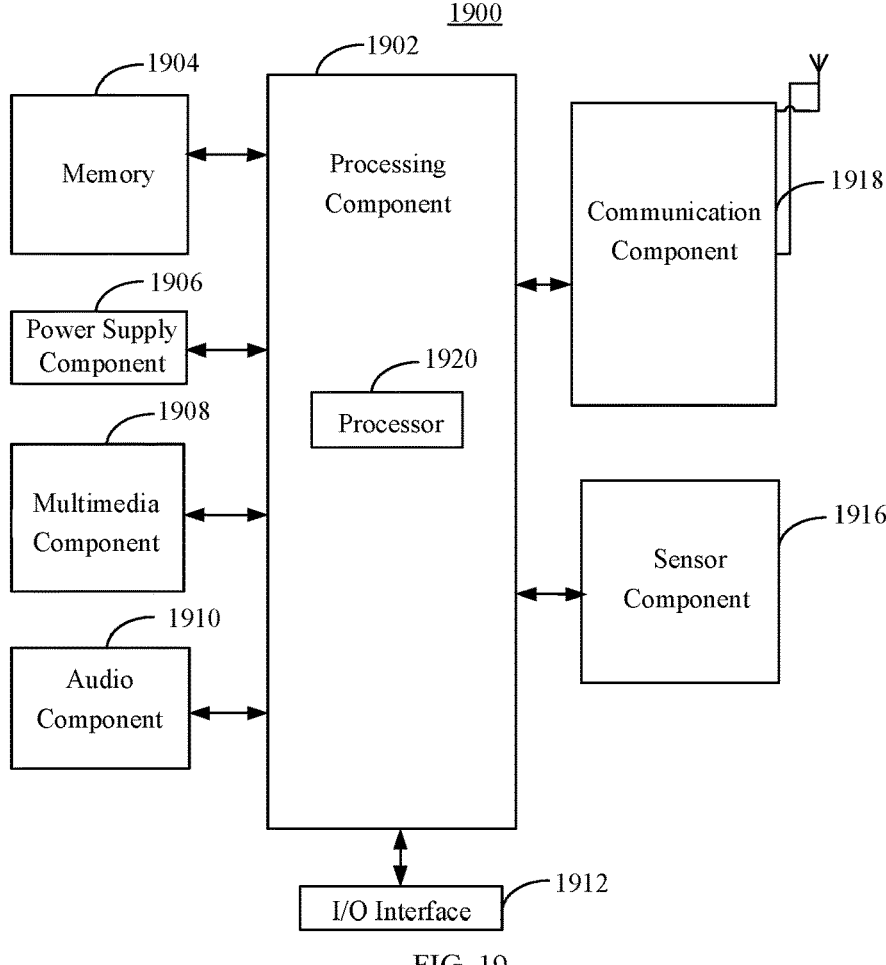
FIG. 19 is a schematic structural diagram of a cell reselection apparatus according to one or more examples of the present disclosure.

FIG. 19 is a block diagram of an electronic device 1900 according to one or more examples of the present disclosure. For example, the electronic device 1900 can be a mobile phone, a tablet computer, an e-book reader, a multimedia player, a wearable device, a vehicle terminal, an iPad, a smart TV, and other terminals.

Referring to FIG. 19, the electronic device 1900 may include one or more of the following components: a processing component 1902, a memory 1904, a power supply component 1906, a multimedia component 1908, an audio component 1910, an input/output (I/O) interface 1912, a sensor component 1916 and a communication component 1918.

The processing component 1902 generally controls overall operations of the electronic device 1900, such as operations associated with display, phone calls, data paging, camera operations, and recording operations. The processing component 1902 may include one or more processors 1920 to execute instructions to complete all or part of the steps of the above cell reselection methods. In addition, the processing component 1902 may include one or more modules which facilitate the interaction between the processing component 1902 and other components. For example, the processing component 1902 may include a multimedia module to facilitate the interaction between the multimedia component 1908 and the processing component 1902. For example, the processing component 1902 can read executable instructions from a memory to implement the steps of the cell reselection methods provided by the above embodiments.

The memory 1904 is configured to store various types of data to support the operation of the electronic device 1900. Examples of such data include instructions for any application or method operated on the electronic device 1900, contact data, phonebook data, messages, pictures, videos, and so on. The memory 1904 may be implemented by any type of volatile or non-volatile storage devices or a combination thereof, such as a Static Random Access Memory (SRAM), an Electrically Erasable Programmable Read Only Memory (EEPROM), an Erasable Programmable Read Only Memory (EPROM), a Programmable Read Only memory (PROM), a Read Only Memory (ROM), a magnetic memory, a flash memory, a magnetic or an optical disk.

The power supply component 1906 provides power to various components of the electronic device 1900. The power supply component 1906 may include a power management system, one or more power supplies, and other components associated with generating, managing, and distributing power for the electronic device 1900.

The multimedia component 1908 includes a screen providing an output interface between the electronic device 1900 and a user. In some embodiments, the multimedia component 1908 may include a front camera and/or a rear camera. The front camera and/or rear camera may receive external multimedia data when the electronic device 1900 is in an operating mode, such as a photographing mode or a video mode. Each of the front camera and the rear camera may be a fixed optical lens system or have focal length and optical zooming capability.

The audio component 1910 is configured to output and/or input an audio signal. For example, the audio component 1910 includes a microphone (MIC). When the electronic device 1900 is in an operating mode, such as a call mode, a recording mode, and a voice recognition mode, the MIC is configured to receive an external audio signal. The received audio signal may be further stored in the memory 1904 or transmitted via the communication component 1918. In some embodiments, the audio component 1910 further includes a speaker to output an audio signal.

The I/O interface 1912 may provide an interface between the processing component 1902 and peripheral interface modules. The above peripheral interface modules may include a keyboard, a click wheel, buttons and so on. These buttons may include, but are not limited to, a home button, a volume button, a starting button and a locking button.

The sensor component 1916 includes one or more sensors to provide status assessments of various aspects for the electronic device 1900. For example, the sensor component 1916 may detect the on/off status of the electronic device 1900, and relative positioning of component, for example, the component is a display and a keypad of the electronic device 1900. The sensor component 1916 may also detect a change in position of the electronic device 1900 or a component of the electronic device 1900, a presence or absence of the contact between a user and the electronic device 1900, an orientation or an acceleration/deceleration of the electronic device 1900, and a change in temperature of the electronic device 1900. The sensor component 1916 may include a proximity sensor to detect the presence of a nearby object without any physical contact. The sensor component 1916 may further include an optical sensor, such as a Complementary Metal Oxide Semiconductor (CMOS) or Charge-coupled Device (CCD) image sensor which is used in imaging applications. In some embodiments, the sensor component 1916 may further include an acceleration sensor, a gyroscope sensor, a magnetic sensor, a pressure sensor, or a temperature sensor.

The communication component 1918 is configured to facilitate wired or wireless communication between the electronic device 1900 and other devices. The electronic device 1900 may access a wireless network that is based on communication standards, such as Wi-Fi, 2G, 3G, 4G, 5G, or 6G, or a combination thereof. In one or more examples of the present disclosure, the communication component 1918 receives a broadcast signal or broadcast-associated information from an external broadcast management system via a broadcast channel. In one or more examples of the present disclosure, the communication component 1918 further includes a Near Field Communication (NFC) module to facilitate short-range paging. For example, the NFC module may be implemented based on a Radio Frequency Identification (RFID) technology, an Infrared Data Association (IrDA) technology, an Ultra-Wide Band (UWB) technology, a Blue Tooth (BT) technology and other technologies.

In one or more examples of the present disclosure, the electronic device 1900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing any of the cell reselection methods described above.

In one or more examples of the present disclosure, there is also provided a non-transitory machine readable storage medium including instructions, such as the memory 1904 including instructions. The instructions may be executed by the processor 1920 of the electronic device 1900 to perform the above cell reselection methods. For example, the non-transitory machine readable storage medium may be a ROM, a Random Access Memory (RAM), a CD-ROM, a magnetic tape, a floppy disk, an optical data storage device, and the like.

Other implementations of the present disclosure will be apparent to those skilled in the art from consideration of the specification and practice of the present disclosure herein. The present disclosure is intended to cover any variations, uses, adaptive changes of the present disclosure that follow the general principles thereof and include common knowledge or conventional technical means in the art that are not disclosed in the present disclosure. The specification and examples are considered as exemplary only, with a true scope and spirit of the present disclosure being indicated by the following claims.

It should be understood that the present disclosure is not limited to the above described structures shown in the drawings, and various modifications and changes can be made to the present disclosure without departing from the scope thereof. The scope of the present disclosure is limited only by the appended claims.

The invention claimed is:

1. A cell capability indication method, comprising:
sending, by a base station, target capability information of one or more neighboring cells, wherein the target capability information is configured to indicate wireless charging capabilities supported by the one or more neighboring cells, and cause a terminal to perform acts comprising:
determining, based on the target capability information, a priority order of the one or more neighboring cells for cell reselection, and
determining a neighboring cell with a highest matching degree between a wireless charging capability supported by the neighboring cell and a wireless charging capability supported by the terminal, wherein the neighboring cell has a highest priority order, as a target neighboring cell for the cell reselection; or
determining a neighboring cell with a highest matching degree between a wireless charging capability supported by the neighboring cell and a wireless charging capability supported by the terminal, wherein the neighboring cell has a best cell signal quality and a highest priority order, as a target neighboring cell for the cell reselection.

2. The method according to claim 1, wherein the sending the target capability information of the one or more neighboring cells comprises:
broadcasting, by the base station, the target capability information through broadcast signaling; or
sending, by the base station, the target capability information to the terminal with a wireless charging capability through unicast signaling.

3. The method according to claim 2, wherein the broadcasting the target capability information through the broadcast signaling comprises:
broadcasting, by the base station, a target system information block (SIB) carrying the target capability information through the broadcast signaling.

4. The method according to claim 2, wherein the sending the target capability information to the terminal with the wireless charging capability through the unicast signaling comprises:
sending, by the base station, target radio resource control (RRC) signaling carrying the target capability information to the terminal with the wireless charging capability.

5. The method according to claim 4, wherein the target RRC signaling comprises RRC reconfiguration signaling or RRC connection reconfiguration signaling.

6. The method according to claim 2, wherein the sending the target capability information to the terminal with the wireless charging capability through the unicast signaling comprises:
in response to receiving a request message for requesting to obtain the target capability information sent by the terminal with the wireless charging capability, sending, by the base station to the terminal, on-demand system information carrying the target capability information.

7. The method according to claim 1, wherein the method further comprises at least one of the followings-:
the target capability information comprises at least one of following information:
whether the one or more neighboring cells support wireless charging, power information of wireless charging supported by the one or more neighboring cells, efficiency information of wireless charging supported by the one or more neighboring cells, cell configuration information of wireless charging supported by the one or more neighboring cells, or maximum numbers of terminals in simultaneous wireless charging supported by the one or more neighboring cells; or the one or more neighboring cells comprise at least one of following cells:

one or more intra-frequency neighboring cells, one or more inter-frequency neighboring cells, or one or more inter-radio access technology (inter-RAT) neighboring cells.

8. A non-transitory computer readable storage medium storing a computer program for implementing the cell capability indication method according to claim 1.

9. A cell reselection method, comprising:

performing, by a terminal, cell reselection based on received target capability information of one or more neighboring cells, wherein the target capability information is configured to indicate wireless charging capabilities supported by the one or more neighboring cells;

wherein performing the cell reselection based on the received target capability information of the one or more neighboring cells comprises:

determining, by the terminal based on the target capability information, a priority order of the one or more neighboring cells for the cell reselection; and performing, by the terminal, the cell reselection based on the priority order;

wherein performing the cell reselection based on the priority order comprises:

determining, by the terminal, a neighboring cell with a highest matching degree between a wireless charging capability supported by the neighboring cell and a wireless charging capability supported by the terminal, wherein the neighboring cell has a highest priority order, as a target neighboring cell for the cell reselection; or determining, by the terminal, a neighboring cell with a highest matching degree between a wireless charging capability supported by the neighboring cell and a wireless charging capability supported by the terminal, wherein the neighboring cell has a best cell signal quality and a highest priority order, as a target neighboring cell for the cell reselection.

10. The method according to claim 9, further comprising:

in response to determining that the terminal is in an idle state, receiving, by the terminal, the target capability information.

11. The method according to claim 10, wherein the receiving the target capability information comprises:

receiving, by the terminal, a target system information block (SIB) carrying the target capability information broadcasted through broadcast signaling; or receiving, by the terminal, target radio resource control (RRC) signaling carrying the target capability information.

12. The method according to claim 11, wherein the target RRC signaling comprises RRC reconfiguration signaling or RRC connection reconfiguration signaling.

13. The method according to claim 10, further comprising:

sending, by the terminal, a request message for requesting to obtain the target capability information;

wherein receiving, by the terminal, the target capability information comprises:

receiving on-demand system information carrying the target capability information.

14. The method according to claim 5, wherein the priority order comprises at least one of following priorities:

a first priority of a first neighboring cell higher than a second priority of a second neighboring cell, wherein the first neighboring cell is a neighboring cell that supports wireless charging, and the second neighboring cell is a neighboring cell that does not support wireless charging; or a third priority of a third neighboring cell higher than a fourth priority of a fourth neighboring cell, wherein a wireless charging capability supported by the third neighboring cell is higher than a wireless charging capability supported by the fourth neighboring cell.

15. The method according to claim 9, wherein the method further comprises at least one of the followings:

the target capability information comprises at least one of the following information:

whether the one or more neighboring cells support wireless charging, power information of wireless charging supported by the one or more neighboring cells, efficiency information of wireless charging supported by the one or more neighboring cells, cell configuration information of wireless charging supported by the one or more neighboring cells, or maximum numbers of terminals in simultaneous wireless charging supported by the one or more neighboring cells; or the one or more neighboring cells comprise at least one of following cells:

one or more intra-frequency neighboring cells, one or more inter-frequency neighboring cells, or one or more inter-radio access technology (inter-RAT) neighboring cells.

16. A non-transitory computer readable storage medium storing a computer program for implementing the cell reselection method according to claim 9.

17. A cell reselection apparatus, comprising:

a processor; and a memory configured to store instructions executable by the processor;

wherein the processor is configured to perform the cell reselection method according to claim 9.

18. A cell capability indication apparatus, comprising:

a processor; and a memory configured to store instructions executable by the processor;

wherein the processor is configured to perform acts comprising: sending target capability information of one or more neighboring cells, wherein the target capability information is configured to indicate wireless charging capabilities supported by the one or more neighboring cells, and cause a terminal to perform acts comprising:

determining, based on the target capability information, a priority order of the one or more neighboring cells for cell reselection, and determining a neighboring cell with a highest matching degree between a wireless charging capability supported by the neighboring cell and a wireless charging capability supported by the terminal, wherein the neighboring cell has a highest priority order, as a target neighboring cell for the cell reselection; or determining a neighboring cell with a highest matching degree between a wireless charging capability supported by the neighboring cell and a wireless charging capability supported by the terminal, wherein the neighboring cell has a best cell signal quality and a highest priority order, as a target neighboring cell for the cell reselection.

* * * * *